United States Patent
Khijniak et al.

(10) Patent No.: US 9,118,652 B2
(45) Date of Patent: Aug. 25, 2015

(54) DETECTING AND MODIFYING SECURITY SETTINGS FOR DEPLOYING WEB APPLICATIONS

(71) Applicant: Microsoft Corporation, Redmond, WA (US)

(72) Inventors: Pavel Khijniak, Redmond, WA (US); Henrik F. Nielsen, Hunts Point, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/141,285

(22) Filed: Dec. 26, 2013

(65) Prior Publication Data

US 2014/0109199 A1  Apr. 17, 2014

Related U.S. Application Data

(62) Division of application No. 11/756,594, filed on May 31, 2007, now Pat. No. 8,621,456.

(51) Int. Cl.
*G06F 13/00* (2006.01)
*H04L 29/06* (2006.01)
*G06F 21/57* (2013.01)

(52) U.S. Cl.
CPC ............... *H04L 63/08* (2013.01); *G06F 21/57* (2013.01); *H04L 63/20* (2013.01)

(58) Field of Classification Search
CPC ................................. G06F 9/546; G06F 9/547
USPC .......................................... 719/311, 313, 314
See application file for complete search history.

(56) References Cited

U.S. PATENT DOCUMENTS

| 5,974,549 | A | 10/1999 | Golan |
| 6,321,334 | B1 | 11/2001 | Jerger et al. |
| 6,366,912 | B1 | 4/2002 | Wallent et al. |
| 6,968,539 | B1 | 11/2005 | Huang et al. |
| 7,142,848 | B2 | 11/2006 | Owen et al. |
| 7,176,791 | B2 | 2/2007 | Sakaki et al. |
| 7,415,707 | B2 | 8/2008 | Taguchi et al. |
| 7,500,099 | B1 * | 3/2009 | McElwee et al. ............. 713/168 |
| 7,532,882 | B2 | 5/2009 | Owen et al. |
| 7,984,435 | B2 | 7/2011 | Kokkinen |
| 8,074,272 | B2 | 12/2011 | Choi et al. |
| 2002/0184499 | A1 | 12/2002 | Taguchi et al. |

(Continued)

OTHER PUBLICATIONS

Office Action for U.S. Appl. No. 11/756,594, mailed on Jan. 4, 2012, Pavel Khijniak, "Detecting and Modifying Security Settings for Deploying Web Applications", 17 pgs.

(Continued)

*Primary Examiner* — Andy Ho
(74) *Attorney, Agent, or Firm* — Julie Kane Akhter; Danielle Johnston Holmes; Micky Minhas (57) ABSTRACT

Various implementations are described herein for detecting and modifying security settings on a computing device to run a web application using a web browser. A loader application detects security settings on the computing device, determines if the security settings will allow the web application to run and function correctly on the computing device, and if necessary, modifies the security settings to allow the web application to run and operate successfully. Further, described herein are techniques for facilitating communication between components corresponding to a web application running in a web browser and external resources.

20 Claims, 4 Drawing Sheets

(56) References Cited

U.S. PATENT DOCUMENTS

| | | |
|---|---|---|
| 2004/0083474 A1* | 4/2004 | McKinlay et al. ............ 717/176 |
| 2004/0168165 A1 | 8/2004 | Kokkinen |
| 2005/0144475 A1 | 6/2005 | Sakaki et al. |
| 2005/0191991 A1 | 9/2005 | Owen et al. |
| 2005/0256960 A1 | 11/2005 | Ganesh et al. |
| 2006/0031833 A1 | 2/2006 | Huang et al. |
| 2007/0016954 A1 | 1/2007 | Choi et al. |
| 2007/0207777 A1 | 9/2007 | Owen et al. |
| 2007/0220502 A1 | 9/2007 | Asselin et al. |
| 2008/0301701 A1 | 12/2008 | Khijniak et al. |

OTHER PUBLICATIONS

Whalen, et al., "Gathering Evidence: Use of Visual Security Cues in Web Browsers", Proceeding GI ' 05 Proceedings of Graphics Interface, 2005, pp. 137-144.

* cited by examiner

DETECTING AND MODIFYING SECURITY SETTINGS FOR DEPLOYING WEB APPLICATIONS

CROSS REFERENCE TO RELATED APPLICATION

This application is a divisional of co-pending, commonly owned U.S. patent application Ser. No. 11/756,594, filed May 31, 2007, entitled "Detecting and Modifying Security Settings for Deploying Web Applications," the entirety of which is herein incorporated by reference.

BACKGROUND

Software applications can be implemented in, among other things, web applications and desktop applications. Typically, web applications are software applications wherein clients using web browsers access servers via the Internet to perform actions such as requesting data, processing data, sending data, displaying data and so forth. To run the web application, users access a uniform resource locator (URL) using a web browser and download any necessary files associated with the web application such as Dynamic Link Libraries (DLL), runtime libraries, Active-X components, etc. Afterwards, users are able to use the web application using the web browser and the corresponding downloaded files. Since web applications do not require users to install the necessary files to run the web applications using CDs (compact discs), DVDs (digital versatile discs) or the like, users are able to download the web applications on demand via the Internet.

Besides simplifying the deployment of software applications, web applications also simplify the maintenance of software applications. Developers are able to make changes to the associated files of the web applications once without needing users to request the updates. Users have the benefit of using the most recent files without having to request updates because web scripts running the web browser may determine changes have been made to certain files and will download the necessary new files. Although web applications simplify the deployment and maintenance of software applications, these advantages may be hindered by security settings of potentials users that may prevent web applications from successfully running on the users' machines.

SUMMARY

The following presents a simplified summary of the disclosure to provide a basic understanding to the reader. This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein are implementations for deploying web applications that include detecting and modifying security settings of user computing devices so that users can successfully run the web applications despite certain security measures deployed on the user computing devices. These web applications include one or more components that run in a web browser and include web scripts, Active-X components, .NET components or the like, which can prompt a user to change the user's security settings or automatically change the user's security settings to allow the web application to execute on the user's computer. Further, these web applications may include a proxy application to facilitate communication between the web browser running the web applications and the one or more web application components on the user's computer. As a result, components of the web applications are able to communicate with external applications via the web browser.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

Overview

The detailed description below describes implementations for detecting and modifying security settings on computing devices used by users to access and run web applications. Using a web browser running on a computing device, a user accesses a URL and attempts to use a web application. For example, the user may select a button on a web page associated with the URL that initiates a process that starts a specific web application. In many cases, the web application may require files to be downloaded to the computing device before it can be successfully run. Once the web application is running, it may perform certain actions that require access to resources running and/or accessible to the computing device. However, certain security measures deployed on the client may need to be modified for the web application to be loaded and run successfully.

To accomplish appropriate security modifications, a loader application associated with the web application is downloaded to the client and executed prior to the web application being loaded in the user's web browser. The loader application detects the security settings on the client.

Once the loader application is downloaded, it executes and detects the current security settings on the computing device. Next, the loader application determines if the current security settings on the computing device are sufficient to download and run the web application. If the security settings are sufficient, the loader application downloads and executes the necessary files associated with the web application and runs the web application. If the security settings are not sufficient, the loader application modifies the security settings appropriately. Once the security settings have been modified, the loader application downloads and executes the necessary files to run the web application.

The client may be configured to allow direct communication between the web browser and the loader application but not between the web browser and the web application and corresponding components. In the present implementation, since the loader application was the first application loaded and run by the web browser, it is able to directly communicate with the web browser. But the web application and its associated components may not be able to directly communicate with the web browser since it was loaded by the loader application.

For example, if a computing device is configured with Microsoft .NET Framework™ and Internet Explorer™ as a web browser, the loader application can communicate directly with the Internet Explorer™. Internet Explorer™ has a single thread that can be used to communicate with the loader application. As a result, if the web application and/or its associated components want to communicate with external resources, they must coordinate with the loader application to communicate.

The loader application facilitates communication between components, external resources, and the web browser by buffering the messages to/from the components until it is able to successfully communicate via the web browser using web scripts.

Figure 1:
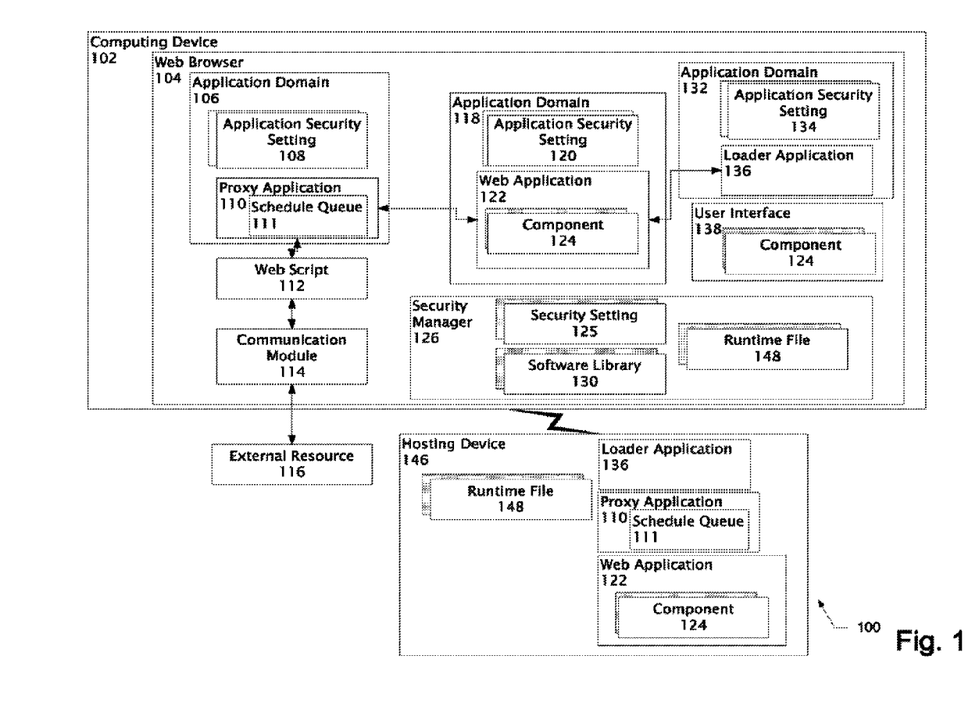
FIG. 1 illustrates an example environment for detecting and modifying security settings on a computing device to run a web application.

FIG. 1 depicts an example environment 100 for detecting and modifying security settings on a computing device to load and run a web application in a web browser. FIG. 1 includes a computing device 102 running a web browser 104 that loads and runs a web application 122 hosted on a hosting device 146, such as a server. The web application 122 includes at least one component 124 such as a text box, a button, an ActiveX component, a .NET component, etc. If applicable, the component 124 may be displayed in a user interface 138. The component 124 may also include an interface (not shown) that enables the web browser 104 to allow web scripts to interact with the component. Further, the web application 122 also has one or more runtime files 148 that may need to be installed and/or executed on the computing device 102 before the web browser 104 can load and run the web application 122. Runtime files may include runtime libraries, dynamic link libraries (DLL), executable code and the like.

Consider the case when a user wants to run a web application using a web browser for the first time. The user accesses a uniform resource locator (URL) via the web browser that is associated with the web application. In FIG. 1, the URL is associated with the web application 122. Once the user accesses the web application via the web browser, the user is prompted to download and run a loader application that detects the security settings on the computing device and modifies the security settings if necessary. In FIG. 1, the user is prompted to download and run a loader application 136. Such a loader application may be implemented in ActiveX components, .NET components, web scripts, etc. It is noted that in at least one alternative implementation, the loader application 136 is be loaded and run automatically once the user accesses the URL, without prompting the user. Further, the loader application 136 is not required to be downloaded to the computing device 102 and it may be run remotely from the hosting device 146.

Computing devices often include security managers that are configured to enable and/or manage security settings on the computing devices. Security managers may be implemented in operating systems, frameworks, platforms, software applications and so forth running on the computing devices. For example, computing devices running Microsoft .NET Framework™ include the Common Language Runtime (CLR)™ that enables and manages security for loading and running files on the computing devices and for accessing resources running and/or accessible to the computing devices.

In FIG. 1, the computing device 102 is running a security manager 126 that includes one or more user security settings 125 that determine how files are loaded and run on the computing device 102. The user security setting 125 may be associated with a user using the computing device 102. Further, the user security settings 128 may be default settings assigned to a user of the computing device 102. For example, the user may be a guest user of the computing device 102 and have security settings that allow the user restricted access to files and resource on the computing device 102. It is noted that any type of software application, operating system, platform, framework, hardware device and so forth capable of enabling and managing security on a computing device may be used in place of the security manager 126.

Most security managers also include various methods for assigning applications that run in web browsers unique application security settings. These application security settings may be different than the user security settings. For example, the CLR™ in Microsoft .NET Framework™ assigns each application downloaded and run in a web browser an application domain that includes one or more application security settings. Further, the CLR™ supports role-based security and code access security. In FIG. 1, the security manager 126 assigns the loader application 136 an application domain 132 that includes one or more application security settings 134. Further, the security manager 126 assigns a proxy application 110 an application domain 106 including one or more application security settings 108 and the web application 122 an application domain 118 including one or more application security settings 120. The proxy application 110 enables communications between the component 124 and an external resource 116. The proxy application 110 is discussed in greater detail below.

The security manager 126 also includes one or more software libraries 130 for processing the loader application 136 in such ways as determining the type of loader application being downloaded and performing various actions on the loader application, such as, for example, creating an instance of the loader application. Software libraries include dynamic link libraries (DLL), runtime libraries, executable code and the like. For example, in Microsoft .NET Framework™, the CLR™ includes a MIME Filter.dll, a IEHost.dll and a IEManager.dll that determine the type of loader application 136 being downloaded, assign security settings, and create an instance of the loader application 136 in the web browser 122, respectively.

Once the security manager 126 assigns the loader application 136 an application domain and application security settings, the loader application 136 detects the assigned application security settings 134 and determines if appropriate security has been enabled to download, run and install the runtime file 148 associated with the web application 122 on the computing device 102. If the loader application 136 determines that there is enough security enabled to load and run the runtime files 148, the loader application downloads the runtime file 148 associated with the web application 122, installs it, and then loads the web application 122. If the security settings are not sufficient, the loader application 136 modifies the application security setting 134 and then downloads and runs the runtime file 148.

The loader application 136 may modify the application security settings 134 and the application security settings 120 and 108 in a variety of ways. For example, if the security manager is Microsoft .NET Framework™ using CLR™, the loader application 136 may run a native ActiveX component that configures the security settings to provide a higher level of trust for files downloaded from a particular URL, in this case the URL (not shown) associated with the web application 122. As a result, the application security settings 134, 120, and 108 may be higher since the URL associated with the loader application 136, the web application 122 and the proxy application 110 has an elevated level of trust, as determined by the CLR™. It is noted that the CLR™ allows the loader application 136 to modify security settings for the proxy application 110 and the web application 122 before they are run on the client computing device 102 by allowing security settings to be configured such that websites (and associated URLs and/or certificates) can be given various levels of trust.

After the loader application 136 downloads and runs the runtime file 148 and the web application 122, the web application 122 and the proxy application 110 are assigned the application domains 118 and 106. It is noted that the loader application 136 may configure application domains for applications that have not yet been downloaded. For example, using Microsoft .NET Framework™, the loader application may configure the CLR™ to trust a variety of URLs and/or certificates of hosting devices that allow the applications to be granted higher levels of security by Microsoft .NET Framework™ since they are trusted. It is noted that the loader application 136 may not include any explicit persistent storage to the computing device 102.

The loader application 136 may also include a custom web script that enables scheduling of messages to be communicated from the web browser 104 to the components running in the web browser. Before the web application 122 can successfully run, all the components included in the web application 122 need to be correctly loaded and initialized. For example, one or more components using the CLR™ may need to be fully initialized by the CLR™ before they can operate correctly. This synchronization of components and web scripts ensures the web application runs correctly.

Proxy applications facilitate communication between the one or more components of the web application running in the web browser and external resources. An external resource may include a remote server, a web service, a software application, a local resource or the like. In FIG. 1, the proxy application 110 facilitates communication between the component 124 and the external resource 116 using a schedule queue 111, a web script 112 and a communication module 114 that is associated with the web browser 104. It is noted that the loader application 136 may perform the same function as the proxy application 110 which would result in not having the proxy application 110.

Consider the case when a user interacts with a web application using a component that includes a text box and a submit button. When the user wants to submit the text for processing, the user clicks on the button. The proxy application receives the text to be submitted to the web application but may buffer the message to a schedule queue until the message is transmitted to the external resource. In FIG. 1, the proxy application 110 stores such a message in a schedule queue 111. Schedule queues may be text files, arrays in software, etc.

The proxy application 110 interacts with the web browser 104 via web scripts 112 supported by the web browser 104. The proxy application 110 requests communication with the web browser 104 via the web scripts 112 by requesting access to a communication thread (not shown) maintained by the communication module 114. In FIG. 1, the web script 112 allows the proxy application 110 to request access to the communication module 114 to access one or more communication threads (not shown). For example, in Microsoft .NET Framework™ and Internet Explorer™, there is only one communication thread. As a result, the web script includes logic for requesting access to the single communication thread that prevents deadlock from occurring if more than one component request access to the single communication thread at the same time. Further, the logic included in the web script in Internet Explorer™ includes logic for making sure a component does not indefinitely control the single communication thread. By including logic in the web scripting for preventing deadlock and enabling asynchronous communication, a web script API (application program interface) is created that allows communication from Internet Explorer™ to the one or more components running in the web browser 104.

Once the web browser 104 makes the communication thread (not shown) available to the proxy application 110, the proxy application 110 retrieves the message from the schedule queue 111 and transmits the message accordingly to the external resource 116. As a result, deadlock is prevented since the schedule queue 111 enables asynchronous communication.

When calls to the component 124 are made via the web browser 104, the web browser 104 calls the component 124 directly using the interfaces (not shown) and include a callback function to prevent deadlocking of the single communication thread (not shown) maintained by the communication module 114.

When calls are made from the component 124 to the web browser 104, requests the proxy application XXX to get access to a communication thread (not shown) maintained by the communication module 114. The component 124 uses one or more methods included in web scripts added by the loader application 136 to schedule a message to be transmitted accordingly.

Figure 2:
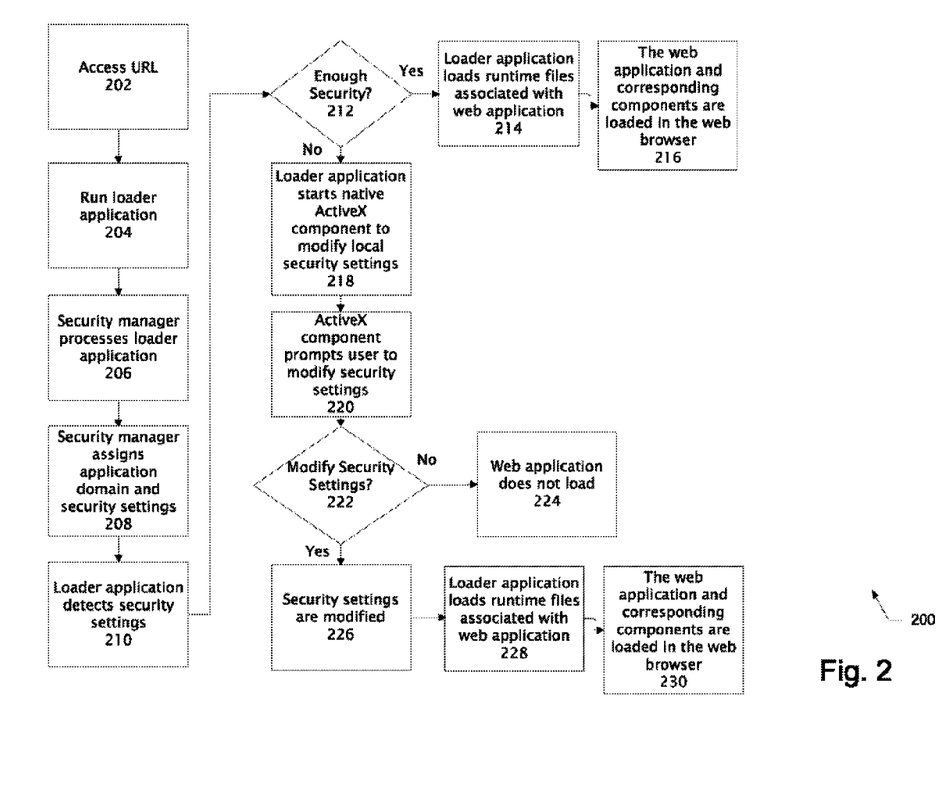
FIG. 2 illustrates a flow chart of an example methodological implementation of detecting and modifying security settings on a computing device to rung a web application.

FIG. 2 depicts a flow chart 200 of an example methodological implementation of detecting and modifying security settings on a computing device to run a web application. In the following description, continuing reference is made to one or more elements shown in FIG. 1, and the same reference numerals used in association with these elements in FIG. 1 are also used in FIG. 2.

At block 202, a user of the computing device 102 accesses a URL associated with the web application 122. The loader application 136 is then downloaded and run on the client computing device 102 (block 204).

At block 206, the security manager 124 processes the loader application 136 using software library 130 to determine what kind of security settings should be assigned. For example, the security manager 124, using software library 130, may determine that the loader application is from a trusted company, such as Microsoft and the like. As a result, the security manager 124 may grant higher security settings.

The security manager 124 then assigns the loader application 136 the application domain 132 that includes the application security setting 134 at block 208.

The loader application 136 detects the application security setting 134 (block 210) and then determines if the application security setting 134 allows the loader application to download and install the runtime files 148 associated with the web application 122 to the computing device 102 (block 212).

If the application security setting 134 allows the loader application 136 to install the runtime files 148 ("Yes" branch, block 212), the loader application 136 downloads the runtime files 148 and installs them on the computing device 102 at block 214. At block 216, the web application 122 and the component 124 loaded and run in the web browser 104. It is noted that the component 124 may be displayed in the user interface 138.

If, however, the application security setting 134 does not allow the loader application 136 to install the runtime files 148 ("No" branch, block 212), the loader application 136 executes a native ActiveX component that may configure the application security settings 134, 120 and 108 (block 218). It is noted that the application security settings 120 and 108 can be modified before the web application 122 and the proxy application 110 are loaded because the security manager 124 and be configured to trust one or more URLs and/or certificates associated with the web application 122 and the proxy application 110. As a result, security settings associated with files loaded and/or run that are associated with URLs and/or certificates will have a higher level of security.

At block 220, the user is prompted to allow modifications to the application security setting 134. If the user chooses not to allow the modifications to the application security setting 134 ("No" branch, block 222), the ActiveX component stops running and the web application is not loaded into the web browser 104 (block 224). But if the user chooses to allow modifications to the application security setting 134 ("Yes" branch, block 222), the ActiveX component modifies the application security setting 134 at block 226. For example, the application security setting 134 may be modified to trust URLs associated with Microsoft Corporation™. Further, specific file names and/or certificates associated with Microsoft Corporation™ may be trusted.

At block 228, the loader application 136 loads and installs the runtime files 148 on the computing device 104 and the web application 122 (including the component 124) loads in the web browser 104 successfully at block 230.

Figure 3:
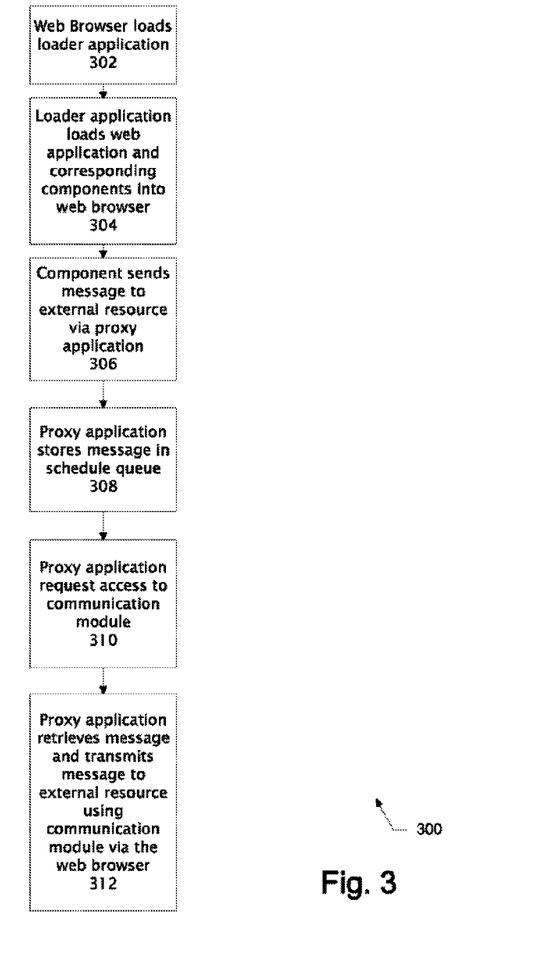
FIG. 3 illustrates a flow chart of an example methodological implementation of facilitating communication between one or more components of a web application and an external resource via a web browser.

FIG. 3 depicts a flow chart 300 of an example methodological implementation of using a proxy application to facilitate communication between components of a web application and external resources via a web browser. In the following description, continuing reference is made to one or more elements shown in FIG. 1, and the same reference numerals used in association with these elements in FIG. 1 are also used in FIG. 3.

At block 302, the web browser 122 runs the loader application 136. The loader application 136 then loads and runs the web application 122 into the web browser 122 (block 304).

At block 306, the component 124 sends a message to the external resource 116 via the proxy application 110, which stores the message from the component 124 to the schedule queue 111 (block 308).

The proxy application 110 requests access to the communication module 114 via the security manager 124 at block 310 and the proxy application 110 is granted access to the communication module 114, retrieves the message from the schedule queue 111 and transmits the message to the external resource 116 via the web browser 104 using the communication module 114 (block 312).

Figure 4:
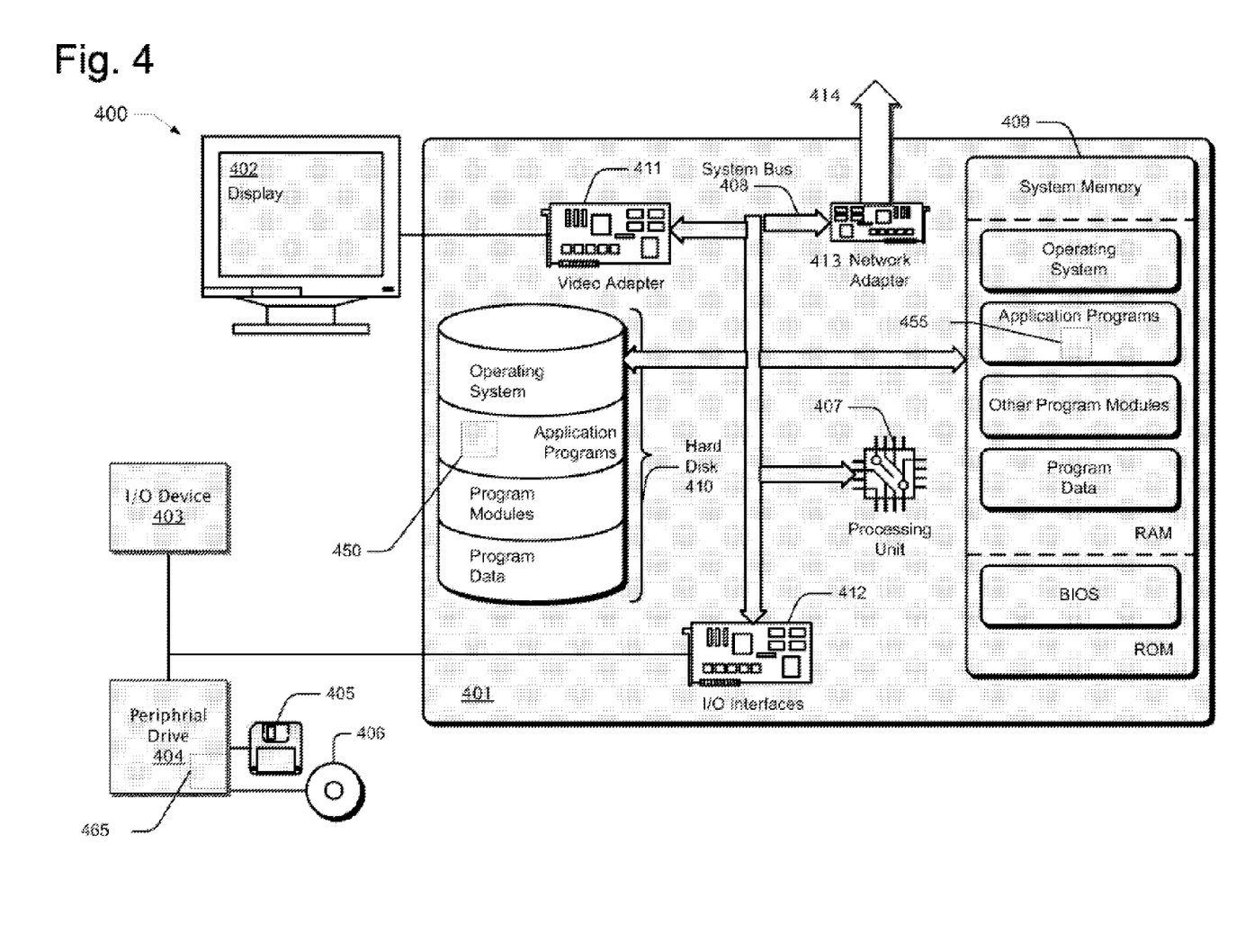
FIG. 4 illustrates an example computing environment in which the various technologies described herein may be implemented.

FIG. 4 depicts an exemplary computing environment in which the various technologies described herein may be implemented. Exemplary computing environment 400 is only one example of a computing system and is not intended to limit the examples described in this application to this particular computing environment. The method for detecting and modifying security settings on a computing device to run a web application may be loaded onto a computing device 401 through the use of computer readable media 405, 406 or over a network 414. Once loaded onto the computing device 401 the method may reside as an application program 450 on an internal hard drive 410. When processing, the method may also exist as an application program 455 loaded into system memory 409.

The computing device 401 can be implemented with numerous other general purpose or special purpose computing system configurations. Examples of well known computing systems, may include, but are not limited to, personal computers, hand-held or laptop devices, microprocessor-based systems, multiprocessor systems, set top boxes, gaming consoles, consumer electronics, cellular telephones, PDAs, and the like.

Components of computing device 401 can include one or more processors (including CPUs, GPUs, microprocessors and the like) 407, a system memory 409, a system bus 408 that couples the various system components, and the method described above. Processor 407 processes various computer executable instructions, including those to execute and run the method for configuring a browser element to communicate with other browser elements and with external applications 450 to control the operation of computing device 401 and to communicate with other electronic and computing devices (not shown). The system bus 408 represents any number of several types of bus structures, including a memory bus or memory controller, a peripheral bus, an accelerated graphics port, and a processor or local bus using any of a variety of bus architectures.

The system memory 409 may include computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 407. The method for detecting and modifying security settings on a computing device to run a web application 455 may be stored in RAM and may be accessible to and/or presently operated on by one or more of the processors 407.

Mass storage devices 404 may be coupled to the computing device 401 or incorporated into the computing device by coupling to the buss. Such mass storage devices 404 may include a magnetic disk drive which reads from and writes to a removable, non-volatile magnetic disk (e.g., a "floppy disk") 405, or an optical disk drive that reads from and/or writes to a removable, non-volatile optical disk such as a CD-ROM or the like 406. Computer readable media such as 405, 406 typically embody computer readable instructions, data structures, program modules and the like supplied on floppy disks, CDs, portable memory sticks and the like. The method for detecting and modifying security settings on a computing device to run a web application 465 may be provided to the CPU 401 by the peripheral device 404.

The methods previously described may be disposed on these computer readable media.

Any number of program modules can be stored on the hard disk 410, Mass storage devices 404, ROM and/or RAM 409, including by way of example, an operating system, one or more application programs, other program modules, and program data. The method for detecting and modifying security settings on a computing device to run a web application 450 may be stored on the hard disk 410 or made available through a peripheral drive 404. Each of such operating system, application programs, other program modules and program data (or some combination thereof) may include an embodiment of the systems and methods described herein.

A display device 402 can be connected to the system bus 408 via an interface, such as a video adapter 411. The display device 402 displays the method for configuring a browser element to communicate with other browser elements and with external applications. A user can interface with computing device 402 via any number of different input devices 403 such as a keyboard, pointing device, joystick, game pad, serial port, and/or the like. These and other input devices are connected to the processors 407 via input/output interfaces 412 that are coupled to the system bus 408, but may be connected by other interface and bus structures, such as a parallel port, game port, and/or a universal serial bus (USB).

Computing device 401 can operate in a networked environment using connections to one or more remote computers through one or more local area networks (LANs), wide area networks (WANs) and the like. The computing device 401 is connected to a network 414 via a network adapter 413 or alternatively by a modem, DSL, ISDN interface or the like.

The storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). It is noted that by utilizing conventional techniques, all, or a portion of the software instructions may be carried out by a dedicated circuit, such as a DSP, programmable logic array, or the like.

What is claimed is:

1. A method for facilitating communication between one or more components of a web application running in a web browser and an external resource, wherein the web browser is running on a computing device with one or more security settings, comprising:
    configuring the one or more security settings using a loader application, the loader application detects and modifies the one or more security settings for loading and executing the web application in the web browser;
    loading and running the one or more components associated with the web application in the web browser;
    buffering one or more messages sent by the one or more components of the web application to the external resource in a schedule queue;
    requesting access to the web browser to transmit the one or more messages to the external resource via the web browser; and
    transmitting the one or more messages to the external resource via the web browser.

2. The method of claim 1, further comprising receiving a message from the external resource for the one or more components running in the web browser.

3. The method of claim 2, further comprising buffering the message from the external resource to the schedule queue.

4. The method of claim 3, further comprising requesting access to the one or more components to communicate the message sent by the external resource.

5. The method of claim 4, further comprising retrieving the message from the schedule queue and transmitting the message to the one or more components.

6. The method of claim 1, further comprising displaying at least one of the one or more components associated with the web application in the web browser.

7. The method of claim 1, wherein the one or more components include at least one of a web script, executable code, a software framework component, or a text box.

8. The method of claim 1, wherein the schedule queue is at least one of an array a file stored on the computing device.

9. One or more computer-readable media storing computer-executable instructions that upon execution cause one or more processors to perform acts comprising:
    configuring one or more security settings of a computing device using a loader application, the loader application detects and modifies the one or more security settings for loading and executing a web application in a web browser;
    loading and running one or more components associated with the web application in the web browser, the one or more components including at least one of a web script, executable code, a software framework component, or a text box;
    buffering one or more messages sent by one or more components of the web application to an external resource in a schedule queue;
    requesting access to the web browser to transmit the one or more messages to the external resource via the web browser; and
    transmitting the one or more messages to the external resource via the web browser.

10. The one or more computer-readable media of claim 9, further comprising displaying at least one of the one or more components associated with the web application in the web browser.

11. The one or more computer-readable media of claim 9, further comprising receiving a message from the external resource for the one or more components running in the web browser.

12. The one or more computer-readable media of claim 11, further comprising buffering the message from the external resource to the schedule queue.

13. The one or more computer-readable media of claim 12, further comprising requesting access to the one or more components to communicate the message sent by the external resource.

14. The one or more computer-readable media of claim 13, further comprising retrieving the message from the schedule queue and transmitting the message to the one or more components.

15. The one or more computer-readable media of claim 9, wherein the schedule queue is at least one of an array a file stored on the computing device.

16. A system comprising:
    one or more processors; and
    a memory that stores one or more components associated with a web application that are executable by the one or more processors to cause the system to:
        configure one or more security settings using a loader application, the loader application detects and modifies the one or more security settings for loading and executing the web application in a web browser;
        load and run the one or more components associated with the web application in the web browser;
        buffer one or more messages sent by the one or more components of the web application to an external resource in a schedule queue;
        request access to the web browser to transmit the one or more messages to the external resource via the web browser; and
        transmit the one or more messages to the external resource via the web browser.

17. The system of claim 16, wherein the one or more components associated with the web application further cause the system to receive a message from the external resource for the one or more components running in the web browser.

18. The system of claim 17, wherein the one or more components associated with the web application further cause the system to buffer the message from the external resource to the schedule queue.

19. The system of claim 18, wherein the one or more components associated with the web application further cause the system to request access to the one or more components to communicate the message sent by the external resource.

20. The system of claim 16, wherein the one or more components associated with the web application further cause the system to display at least one of the one or more components associated with the web application in the web browser.

* * * * *